Feb. 20, 1962 K. H. LIBOM 3,021,745
WEDGE DEVICE FOR ANCHORING BOLTS IN HOLES
Filed June 3, 1958

INVENTOR
KARL HELMER LIBOM
BY
ATTORNEY.

UNITED STATES PATENT OFFICE 3,021,745
Patented Feb. 20, 1962

3,021,745
WEDGE DEVICE FOR ANCHORING
BOLTS IN HOLES
Karl Helmer Libom, Bredbyn, Sweden, assignor to
Aktiebolaget Kerel, Sundsvall, Sweden
Filed June 3, 1958, Ser. No. 739,541
3 Claims. (Cl. 85—2.4)

The present invention relates to devices for fastening, locking or anchoring bolts or screws in holes, mainly borings, and principally to devices of the type wherein the bolt is provided with an inclined surface arranged at an angle to the longitudinal axis of the bolt and adapted to cooperate with a corresponding surface of one or more key or wedge members so as to firmly press and secure the bolt against the walls of the hole.

It is one object of the present invention to provide an anchoring device which obviates the hitherto necessary grooves in the bolt.

It is another object of the present invention to provide an anchoring device which has a greatly enlarged area of contact between the bolt and the wedge as well as between the wedge and the walls of the hole. This object is very important especially in respect of holes bored in rocks or other materials of soft or brittle characters.

It is a still further object of the present invention to provide an anchoring device which obtains efficient and dependable guiding for the wedge on and along the bolt.

It is yet another object of the present invention to provide an anchoring device wherein the side of the wedge facing the bolt has one or more further surfaces in addition to its surface corresponding to the inclined surface of the bolt, which additional surfaces have e.g. a cylindrical form corresponding to the diameter and/or cross-sectional form, and in that the external side of the wedge adapted to engage the walls of the hole has a preferably substantially cylindical envelope surface corresponding to the form and diameter of the hole.

With these and other objects in view which will become apparent in the following detailed description, the present invention will be clearly understood in connection with the accompanying drawings, in which.

Figure 1:
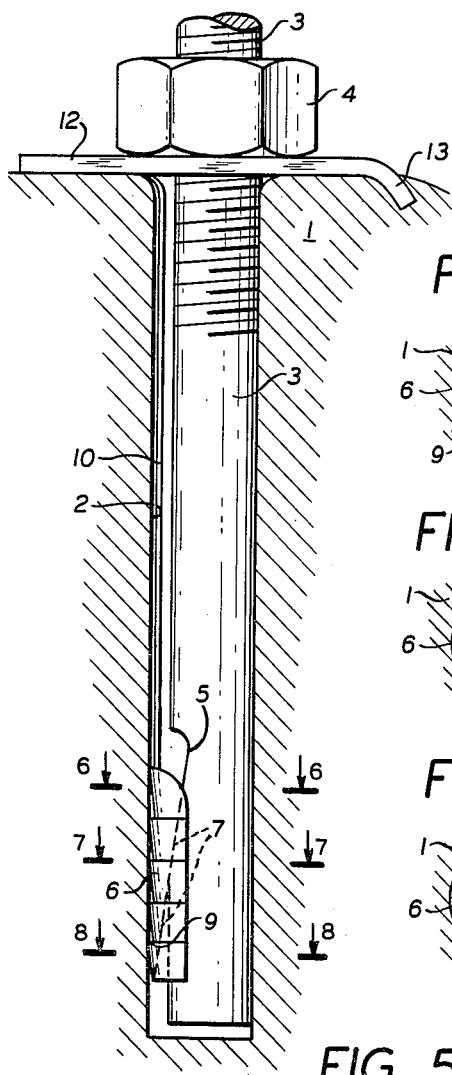
FIGURE 1 is a partly sectional view showing the device according to the present invention as applied on a bolt inserted into a vertical hole drilled in a rock or any other material.
Figure 2:
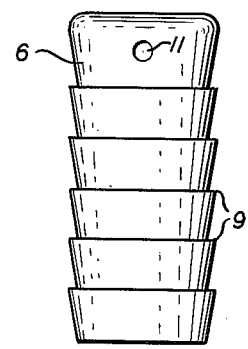
FIG. 2 shows a wedge, or key member of FIG. 1 as seen from the left in FIG. 1.
Figure 6:
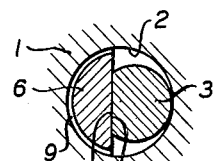
FIG. 6 is a cross-section along the lines 6—6 of FIG. 1.
Figure 4:
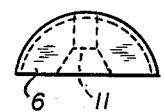
FIG. 4 is a top plan view of the wedge in FIG. 1.
Figure 7:
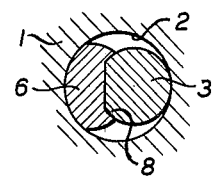
FIG. 7 is a cross-section along the lines 7—7 of FIG. 1.
Figure 3:
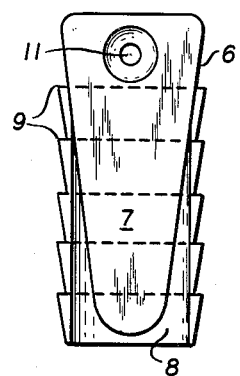
FIG. 3 is a side view of the wedge.
Figure 8:
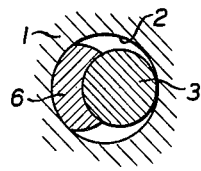
FIG. 8 is a cross-section along the lines 8—8 of FIG. 1.

Referring now to the drawing and in particular to FIG. 1, a rock 1 has a hole 2 drilled therein and a rod or bolt 3 is firmly and securely fastened in the hole 2. The upper portion of the bolt 3 is screw threaded so as to receive a nut 4, while a lower portion of the bolt 3 is provided with an inclined and downwardly in outer direction extending surface 5 arranged at an acute angle to the longitudinal axis of the bolt 3 and adapted to cooperate with a corresponding inclined surface 7 on a key or wedge member 6 in such a manner that when the nut 4 is turned in a direction to lift the bolt 3 a strong wedging action is produced which is likely to retain the bolt 3 in the hole 2 and which action is only increased by any attempts to withdraw the bolt 3 out of the hole 2.

In the embodiment shown in FIGS. 1 to 4, the surfaces 5 and 7 are plane, and in addition to its plane surface 5 the wedge member 6 has another surface 8 facing the outer surface of the bolt 3, the last-mentioned surface 8 having a part-cylindrical form corresponding to the diameter and/or cross-sectional form of the bolt 3. An intimate frictional engagement between the part-cylindrical surface of the wedge member 6 and the outer cylindrical surface of the bolt 3 is obtained upon relative axial movement between the bolt 3 and the wedge member 6, during which movement, the plane surfaces 5 and 7 of the bolt and wedge member, respectively, slide along each other until the locking position of the wedge member 6 is reached. In such locking position, the frictional engagement between the wedge member 6 and the bolt 3 takes place not only on the plane surfaces 5 and 7 of the bolt and wedge member, respectively, but simultaneously also between the part cylindrical surfaces 8 of the wedge member 6 and the outer cylindrical surface of the bolt 3. The side of the wedge member 6 facing the bolt 3 thus has a combined or dual surface consisting of one plane (wedging) portion 7 and two part cylindrical portions 8. These surface portions 8 together with the plane surface portion 7 provide for a very efficient guiding action as it embraces a considerable part of the circumference of the bolt 3, no longitudinal or other grooves being necessary in the bolt. This guiding action is greatly further enhanced by the engagement between the outer envelope surface of the wedge member 6 and the walls of the hole 2.

The side of the wedge member 6 facing the wall of the hole 2 has a cylindrical envelope surface corresponding to the form and the diameter of the hole 2. This envelope surface has a very great area, and therefore it is very useful also for performing a firm grip even in brittle and soft rocks. In order to provide a still more dependable engagement between the wall of the hole and the wedge member 6, the latter is suitably provided with cams, steps, flues or fish scale projections 9 tending to prevent the wedge from being accidentally drawn out of the hole 2.

For proper operation of the wedge member 6, the latter is provided, in a manner known per se, with an operating or wire member 10, e.g. suitably fastened in a hole 11 in the wedge member 6. If necessary, a washer 12 may be placed under the nut 4. The washer 12 may have a bent portion 13 penetrating into the ground. It will be understood that the embodiment described, referred to in FIGS. 1 to 4, is only an example, as many other embodiments are possible within the scope of the present invention.

Figure 5:
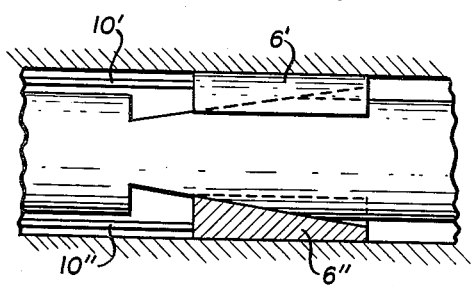
FIG. 5 shows a modified embodiment according to the present invention comprising two wedge members applied on a bolt in a horizonal hole.

Referring now to FIG. 5, the second embodiment is substantially identical with the above described embodiment and is merely a duplication of the latter having two oppositely disposed wedge members 6' and 6", each of which has an operating wire member 10' and 10", respectively.

While I have disclosed several embodiments of the present invention, it is to be understood that these embodiments are given by example only and not in a limiting sense, the scope of the present invention being determined by the objects and the claims.

I claim:

1. A device for anchoring a screw bolt in a hole, mainly borings, said screw bolt having a substantially cylindrical outer surface at one end and a threaded surface at the other end thereof and being provided with an axially disposed open recess close to said one end of said bolt and extending along a chord of the substantially circular cross-section of said bolt, said recess being limited by an inclined surface disposed at an acute, downwardly and outwardly extending angle to the longitudinal axis of said bolt, and at least one wedge member having an inclined surface complementary to said inclined surface of said bolt, said inclined surface of said wedge member cooperating with and at least partly engaging said inclined surface of said bolt in the locking position between said bolt and said wedge member, and said wedge member having additionally two inner, partly cylindrical surfaces merging with said inclined surface thereof and complementary to and engaging a portion of said cylindrical surface of said bolt substantially along the entire axial length of and adjacent to said inclined surface of said wedge member in the locking position between said bolt and said wedge member, and said wedge member having a partly, cylindrical outer surface engaging the surface of said hole in said locking position, arrived at upon relative axial movement between said bolt and said wedge member, said bolt being firmly pressed radially and secured against the wall of said hole due to the frictional engagement between said inclined surface and said smooth outer surface of said bolt, on the one hand, and said inclined surface and said two inner, partly cylindrical surfaces of said wedge member, on the other hand.

2. The device, as set forth in claim 1, wherein said partly cylindrical, outer surface of said wedge member has a radius larger than that of said bolt and substantially equal to that of said hole.

3. The device, as set forth in claim 1, wherein said partly cylindrical outer surface of said wedge member has projections penetrating the inner cylindrical surface of said hole.

References Cited in the file of this patent

UNITED STATES PATENTS

| | | |
|---|---|---|
| 1,034,607 | Frank et al. | Aug. 6, 1912 |
| 1,396,398 | Bowman | Nov. 8, 1921 |
| 2,231,068 | Harrington | Feb. 11, 1941 |
| 2,560,525 | Nyl | July 10, 1951 |
| 2,774,273 | Olson | Dec. 18, 1956 |